(No Model.)

J. LOGAN.
GAGE.

No. 283,627. Patented Aug. 21, 1883.

WITNESSES
A. O. Orne.
Fred A. Powell

INVENTOR
John Logan.
by
Crosby & Gregory
Attys.

United States Patent Office.

JOHN LOGAN, OF WALTHAM, MASSACHUSETTS.

GAGE.

SPECIFICATION forming part of Letters Patent No. 283,627, dated August 21, 1883.

Application filed May 15, 1883. (No model.)

*To all whom it may concern:*

Be it known that I, JOHN LOGAN, of Waltham, county of Middlesex, State of Massachusetts, have invented an Improvement in Gages, of which the following description, in connection with the accompanying drawings, is a specification, like letters on the drawings representing like parts.

My invention, relating to gages, has for its object to produce a simple and efficient device for gaging the distance between two surfaces—as, for instance, in measuring the depth of a shoulder or groove or hole in an article—and also for measuring the diameter or thickness of an article. The gage consists, essentially, of a main portion or case provided with a dial and pointer adapted to have its movement multiplied to insure greater delicacy of measurement, and with gaging surfaces or points fixed relative thereto, and a gaging-bar movable longitudinally in the said case, and adapted to operate the pointer in the said movement, the said bar having gaging surfaces or points co-operating with the fixed points connected with the case, and the pointer indicating the amount of movement of the said bar. One end of the bar is provided with a jaw or projection extending at right angles thereto and co-operating with a jaw or projection fixed relative to the case, these parts thus constituting a jaw or caliper-gage, while the other extremity of the said bar extends out at the other side of the case, and, co-operating with a rod fixed upon the said case at the side of the bar, produces what may be called a "depth-gage." A spring acting on the pointer and connected gaging-bar tends to hold the latter in its normal position with the pointer at zero, the jaws in contact, and the extremity of the gaging bar and rod in the same plane with one another.

Figure 1:
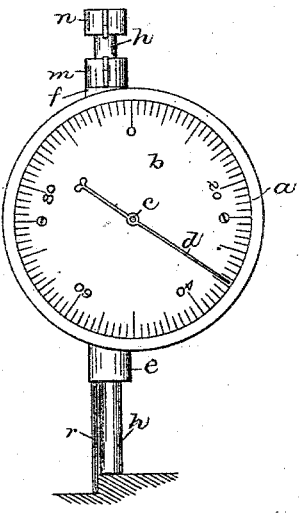
Figure 2:
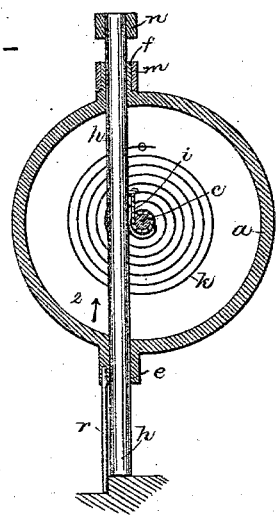

Figure 1 is a front elevation of a gage embodying this invention, it being shown as operating as a depth-gage; Fig. 2, a longitudinal section thereof; and Fig. 3, a side elevation, showing the gage operating as a caliper-gage.

The case $a$, provided with a dial, $b$, having suitable graduations, has pivoted at its center an arbor or drum, $c$, carrying a pointer, $d$, the end of which co-operates with the graduations of the said dial. The case $a$ has tubular projections $ef$, which serve as guides for the gaging-bar $h$, which is longitudinally movable in the said guides, and projects beyond them out through the case. The bar $h$ is connected with the arbor $c$ of the pointer $d$, so as to rotate the said arbor and turn the said pointer when the said bar is moved longitudinally relative to the case. In this instance the connection between the bar and arbor consists of a chain, $i$, connected at one end with a projection from the said bar and wound around and connected at its other end with the arbor $c$, so that as the bar $h$ moves in the direction of the arrow 2, Fig. 2, the said chain unwinds from and rotates the arbor $c$, and thus turns the pointer. A spring, $k$, connected at one end with the arbor $c$ and at the other end with the case $a$, tends to rotate the arbor in the direction to wind the chain thereon, and thus move the bar $h$ in the direction opposite to the arrow 2. The guide projection $f$ for the bar $h$, at one side of the case $a$, is provided with a jaw, $m$, fixed thereon, as by a set-screw, to prevent the jaws falling out of line, and the bar $h$ has fixed to it a corresponding jaw, $n$, the said jaws co-operating to measure the diameter or thickness of a rod or other article inserted between them, thus operating as a jaw or caliper-gage, and they also serve as a stop to limit the movement of the bar $h$ when acted upon by the spring $k$, they coming in contact and arresting the said movement when the pointer is at zero. The guide projection $e$ at the other side of the case $a$ is provided with a gaging-rod, $r$, made slender, so as to enter a small recess, slot, or hole in an article, the end of the said rod being in line with the end of the bar $h$ when the latter is in its normal position, or when the jaws $m$ and $n$ are in contact and the pointer is at zero. By placing the end of the bar upon the surface of an article adjacent to the edge of a hole or recess or slot the depth of which is to be measured, and by pressing the case toward the said surface, the rod $r$ will enter the said recess, and the movement of the case will be arrested when the said rod $r$ reaches the bottom thereof, as shown in Figs. 1 and 2, the movement of the pointer $d$ then indicating the amount of movement of the end of the bar $h$ relative to the end of the rod $r$, or the depth of the recess. The movement of the end of the pointer is much greater than that of the bar $h$, so that the readings are very delicate, the increase in movement at the dial over the actual distance measured being about in the ratio of the length of the pointer $d$ to the radius of the arbor $c$.

Figure 3:
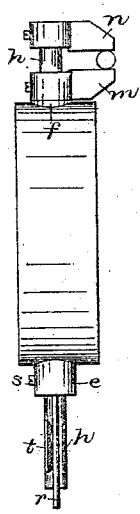

It is obvious that mechanism might be employed for still further multiplying the movement, and thereby increasing the delicacy of the gage, or that other mechanism might be employed for transmitting the motion from the bar $h$ to the pointer. The bar $h$ is prevented from rotating in its guides $m$ $n$ by a screw, $s$, entering a longitudinal slot, $t$, in the side of the bar $h$, as shown in Fig. 3.

I claim—

1. In a gage, the main portion provided with a dial and pointer and a fixed gaging-rod adapted to enter a recess or depression, combined with the movable gaging-bar and means to multiply at the pointer the movement of the bar, whereby the depth of the said recess or depression below the adjacent surface may be measured, substantially as described.

2. The main portion having a dial and pointer and guides, one provided with a jaw and the other with a gaging-rod adapted to enter a recess or depression, combined with the bar, longitudinally movable in the said guides, and provided with a jaw, and connecting mechanism between the said bar and pointer to multiply at the pointer the movement of the said bar, substantially as described.

3. The case and jaw and gaging-rod fixed with relation thereto, and the dial and pointer and its arbor, pivoted in the said case, combined with the longitudinally-movable gaging-bar connected with the said arbor, and adapted to co-operate at one end with the said rod, and provided at its other end with a jaw, and the spring tending to move the said arbor and bar in one direction, substantially as described.

In testimony whereof I have signed my name to this specification in the presence of two subscribing witnesses.

JOHN LOGAN.

Witnesses:
JOS. P. LIVERMORE,
W. H. SIGSTON.